United States Patent [19]

Brane et al.

[11] Patent Number: 5,065,901

[45] Date of Patent: Nov. 19, 1991

[54] APPARATUS FOR MONITORING A FLOW OF FLUID THROUGH A FILTER MEDIUM

[76] Inventors: Earl P. Brane, Rte. One Box 88, Hideaway Hills, Ohio 43107; Douglas K. Brane, 205 Poinciana La., Largo, Fla. 34640

[21] Appl. No.: 698,612

[22] Filed: May 10, 1991

Related U.S. Application Data

[63] Continuation-in-part of Ser. No. 507,352, Apr. 9, 1990.

[51] Int. Cl.$^5$ ............................................... B67D 5/30
[52] U.S. Cl. ........................................ 222/20; 73/198; 137/624.11; 210/88; 210/100; 222/14
[58] Field of Search .................... 210/87, 88, 89, 100; 73/198; 137/624.11; 222/14, 16, 17, 20

[56] References Cited

U.S. PATENT DOCUMENTS

| | | | |
|---|---|---|---|
| 2,589,650 | 3/1952 | Wolcott, Jr. | 222/20 |
| 2,810,435 | 10/1952 | Demi et al. | 137/624.11 |
| 3,097,762 | 7/1963 | Charnata et al. | 222/20 |
| 4,202,467 | 5/1980 | Rutten et al. | 222/20 |
| 4,681,677 | 7/1987 | Kuh et al. | 210/88 |
| 4,698,146 | 10/1987 | Ellis | 210/87 |
| 4,708,264 | 11/1987 | Bruninga | 222/220 |
| 4,769,135 | 9/1988 | Norton | 73/198 |
| 4,903,731 | 2/1990 | Pappy | 222/20 |

Primary Examiner—Michael S. Huppert
Assistant Examiner—Kenneth Bomberg
Attorney, Agent, or Firm—Mueller and Smith

[57] ABSTRACT

Apparatus is provided for use as an in-line fluid flow monitor through filter media of a variety typically employed in households upstream of a kitchen faucet. The apparatus includes a housing with an input port leading to a housing cap within which a turbine chamber retains a rotating turbine. The rotating turbine is coupled to a reduction gear train positioned within a gear housing, in turn, retained within the body of the housing in a reduction gear chamber. Fluid communication is provided from the turbine chamber to the gear reduction chamber. The gear reduction chamber ends in an eccentric output which drives the pawl of a pawl and ratchet assembly forming a part of a rotatable valve. This rotatable valve rotates in increments as a camming stem affixed thereto moves along a camming surface until encountering a slot component. When the slot component is encountered, the rotatable valve and camming stem falls into it under spring bias to close the valve to provide a cue to the user that the predetermined quantity of flow of fluid has occurred. The device then is simply reset by hand by manipulating the camming stem back upon the camming surface.

21 Claims, 4 Drawing Sheets

APPARATUS FOR MONITORING A FLOW OF FLUID THROUGH A FILTER MEDIUM

RELATED APPLICATIONS

The present application is a continuation-in-part of application for U.S. Ser. No. 07/507,352, filed Apr. 9, 1990, entitled "Apparatus for Monitoring a Flow of Fluid through a Filter Medium".

BACKGROUND OF THE INVENTION

The quality of water, for example as provided by utility organizations to domestic households and the like ranges widely. In general, it has been observed to have diminished to the extent that a water quality enhancement industry has developed of significant proportions.

One generally less expensive approach to water quality improvement provides for the positioning of a filter at a faucet location where water is drawn for drinking and cooking purposes. Typically, this location is at the kitchen sink. The type filter desired for this application usually is of an "in-line" variety located within the water line ahead of or before the faucet at the sink. Such filters are quite simple, typically being provided as a retainer holding a filtration medium such as charcoal or the like used to remove contaminants. These filtration media have a limited capacity generally based on the number of gallons of water passing through them. Following a predetermined flow quantity, for example from 500 to 2400 gallons, the filtration medium must be changed, whereupon a next filtering period ensues. The number of gallons of water representing such filter capacity varies with the quality of water encountered, as well as with the filter used. Thus, a time estimate of useful filter life may be made based on these variables, as well as the extent of household use of water at the location of filtration. However, such estimates are inherently inaccurate and filter replacement is made in reliance on the householder's memory of the projected replacement date. Thus, a metering device is desirable for water use monitoring which remains inexpensive enough for the limited application at hand, but which is of a rugged and robust structure sufficient to withstand water line pressures, which typically are at 125 psi and can reach higher levels during water pressure excursions. For example, such devices should meet national criteria for performance at 400 psi.

In addition to measuring flow, these metering devices should be simply adjustable for accommodating various filter capacities and should provide some form of cuing to the user as to when time for replenishment is at hand. Installation of the meter and associated cuing logic should be simple in keeping with the noted cost criteria. In this regard, the utilization of electronics and associated power supply wiring or battery replenishment should be avoided. Generally, a turbine form of metering is contemplated for the purposes at hand, however, the rotational rate for such turbines, when used with purely mechanical metering structures requires a technique for rotation monitoring wherein the number of rotations may exceed 3,900,000. To achieve a necessary compactness while still carrying on such monitoring in a mechanical manner has posed difficulties to filter designers.

SUMMARY

The present invention is addressed to apparatus for monitoring the flow of fluid through a filter medium. Particularly suited to in-line household applications, the monitoring apparatus is fabricable under the cost constraints associated with such uses, while evidencing a design which provides reliable performance under the relatively higher line pressures encountered upstream of a household faucet or the like. Utilizing a turbine as a flow-to-mechanical monitoring output transducer, the monitor incorporates a rotational reduction scheme of greater than 3,900,000:1 while remaining housed within a highly compact housing. Necessary cuing to the household user that a filter medium is expended is by the simple procedure of turning off the fluid or water to an associated downstream sink faucet. However, the resetting procedure for the monitor is advantageously simple, requiring an elementary hand motion on the part of the user. Further, the device may be readily adjusted by the user for the fluid flow capacity of any given filter medium.

To achieve a simplicity of assembly, the monitoring apparatus is configured such that a sub-assembly is formed including a gear housing body which is constructed having upper and lower centrally aligned bearings retaining a central drive shaft. This drive shaft not only retains one array of gears of the gear reduction train, but also extends upwardly to support a turbine. The turbine, in turn, includes a drive component which extends within the upper bearing structure to impart drive to the reduction gear train assemblage. The sub-assembly additionally includes a rotational drive member which is rotatably driven by a ratchet and pawl arrangement which, in turn, is driven from an eccentric output of the reduction gear train. This sub-assemblage then is employed in conjunction with a rotatable valve member which is located within a valve cavity of the body or housing of the monitoring device. By employing a low tolerance slideable drive fit between the rotatable valve body and the sub-assembly rotatable component, the manufacturing assembly of the entire monitoring apparatus is readily carried out without encountering difficulties associated with tolerance build-ups and the like.

Another feature of the invention is to provide apparatus for monitoring a flow of fluid through a conduit. A housing is provided having an input port and an output port which is connected with the conduit. A turbine chamber is present within the housing in fluid communication with the input port for receiving fluid under pressure and a gear chamber exists within the housing adjacent the turbine chamber. A gear housing assembly is provided which is positioned within the gear chamber and which includes a gear housing body having a top including a shaft bearing and a bottom having a gear train output opening and a shaft receiving opening. A drive shaft extends through and is supported by the shaft bearing and is positioned within the shaft receiving opening. A reduction gear train is provided with the assembly having a first gear array mounted for rotation upon the drive shaft and a second gear array operationally emmeshed with the first gear array to derive a predetermined reduction ratio, the gear train having an eccentric output component at the gear train output opening, and a rotational drive component is provided with the sub-assembly which is mounted for rotation upon the gear housing body bottom, is movable in select correspondence with the eccentric output component and has a valve drive portion. A turbine is mounted upon the drive shaft within the turbine chamber and is rotatable by fluid incident thereon from the input port and is coupled in driving relationship with the reduction gear train. A valve seat is formed within the housing adjacent the output port and includes an open valve cam surface, and a valve closing detent portion. A rotatable valve member is provided which is mounted within the housing, has an upwardly disposed driven portion slideabley engageable with the rotational drive component valve drive portion, and further has a valve closure portion extending therefrom including a camming stem slideably movable upon the valve cam surface to retain the valve closure portion in an open valve orientation and is movable into the valve seat detent portion to effect blockage of fluid flow through the output port. A reset arrangement is provided for repositioning the rotatable valve camming stem upon the cam surface to effect opening the valve for permitting the flow therethrough of a predetermined quantity of fluid.

Another feature of the invention is to provide apparatus for monitoring the flow of fluid under pressure through a filter medium of given capacity. The apparatus includes a housing having a body member and a cap coupled thereto as well as a turbine chamber formed within the housing cap and a gear chamber within the housing body extending from the turbine chamber when the cap is coupled to the body and in fluid flow communication therewith. A valve chamber is located within the housing body adjacent to and in fluid flow communication with the gear chamber and has a valve seat, a valve cam surface, and a valve closing slot. A gear housing assembly is provided which is slideably positionable within the gear chamber and includes a gear housing body having a top including a centrally disposed inwardly extending shaft bearing and a first shaft receiving cavity spaced therefrom, a bottom having a gear train output opening aligned with the first shaft receiving cavity, a second shaft receiving cavity aligned with the shaft bearing, and fluid passage openings within the top and bottom. The assembly further includes a first drive shaft having one end supported within the second shaft receiving cavity and the opposite end extending through and supported by the shaft bearing. The assembly further includes a reduction gear train having a first gear array mounted for rotation on the first drive shaft, a second gear array including an eccentric output component mounted for rotation upon the gear train output opening, a second drive shaft mounted between the eccentric output component and the first shaft receiving cavity for supporting the second gear array in operative association with the first gear array and, finally included within the assembly is a rotational drive component which is mounted for rotation upon the gear housing body bottom, movable in select correspondence with the rotation of the eccentric output component and has a slideably engageable valve drive portion. A turbine is rotatably mounted upon the drive shaft within the turbine chamber and has a gear drive component extending within the shaft bearing which is coupled in driving relationship with the second gear array. An input port is provided in fluid flow communication with the turbine chamber for directing the flow of fluid under pressure thereinto to effect rotation of the turbine. A rotatable valve member is mounted for rotation about a valve axis parallel with the first drive shaft, having an upwardly disposed driven portion slideably engageable with the rotational drive component valve drive portion, has a valve closure portion extending therefrom, and movable along the valve axis into closing contact with the valve seat, and a camming stem slideably movable upon the valve cam surface during rotation to retain the valve closure portion at a location remote from the valve seat effecting an open valve orientation and movable along the valve axis into the closing slot to effect positioning of the valve closure portion into valve closing contact with the valve seat. An output port is provided in fluid flow communication with the valve chamber for receiving the flow of fluid under pressure when the rotatable valve member is in the open valve orientation. A reset arrangement is provided for repositioning the rotatable valve camming stem for movement upon the valve cam surface to provide for the rotation of the rotatable valve about the valve axis an amount predetermined with respect to the filter medium capacity.

Other objects of the invention will, in part, be obvious and will, in part, appear hereinafter. The invention, accordingly, comprises the apparatus possessing the construction, combination of elements, and arrangements of parts which are exemplified in the following detailed disclosure.

For a fuller understanding of the nature and objects of the invention, reference should be had to the following detailed description taken in connection with the accompanying drawings.

DETAILED DESCRIPTION OF THE INVENTION

Water flow monitors structured in accordance with the invention are relatively small and capable of carrying out a gear reduction of the output of a small turbine at a reduction ratio greater than 3,000,000:1. This reduction is achieved within an inexpensive structure which still remains of such robust design that it is capable of being used in line under relatively higher water pressures. Further, the monitors provide the householder with a cuing as to the point in time wherein the capacity of an associated filter medium has been reached. This is achieved by closing off the water flow or, at least substantially closing it off such that the user is aware that filter replacement is needed and the flow monitoring device is to be reset. Somewhat ideally, the resetting procedure also permits the monitor to be set for a variety of filter capacities as expressed in volumetric values.

Figure 1:
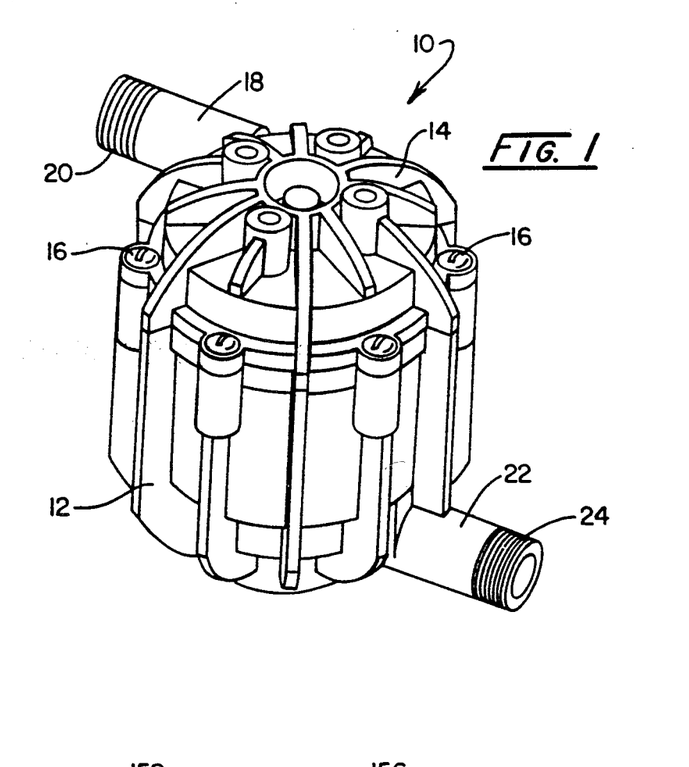
FIG. 1 is a perspective view of a fluid flow monitor according to the invention.

Looking to FIG. 1, the monitor is represented generally at 10 as including a housing 12 with a body portion of strong ribbed construction and having a cap portion 14 which is attached thereto by an array of screws, certain of which are represented at 16. Note that the cap 14 also is configured having reinforcing ribs thereon. Leading to the cap 14 is an input conduit 18 having a threaded end portion 20 suited for coupling within a household water line. In similar fashion, the lower region of housing 12 has integrally formed therein an output conduit 22 having a threaded end portion thereon 24 to facilitate insertion of device 10 within the water line-filter assembly. To remain within necessary cost constraints, the device 10 is formed of a plastic, however, the selection of this plastic material preferably is such as to provide a very strong polymer, for example a glass filled "Nylon" material identified as number 7033 marketed by E. I. DuPont De Nemours and Company.

Between the input conduit 18 and the exit or output conduit 22, water is caused to flow through the device 10 in somewhat of an axial manner coursing across the components which carry out the monitoring function. Looking additionally to FIG. 2 in conjunction with the figures to follow and, for the instant description, to FIGS. 3 and 4, fluid enters the device 10 from input conduit 18 at an input port 26 extending, in turn, to a turbine chamber 28 formed within cap 14. A turbine as at 30 is rotatably mounted within the chamber 28 to be driven from fluid exiting the input pot 26. Note that the turbine is configured for unidirectional rotation.

Figure 3:
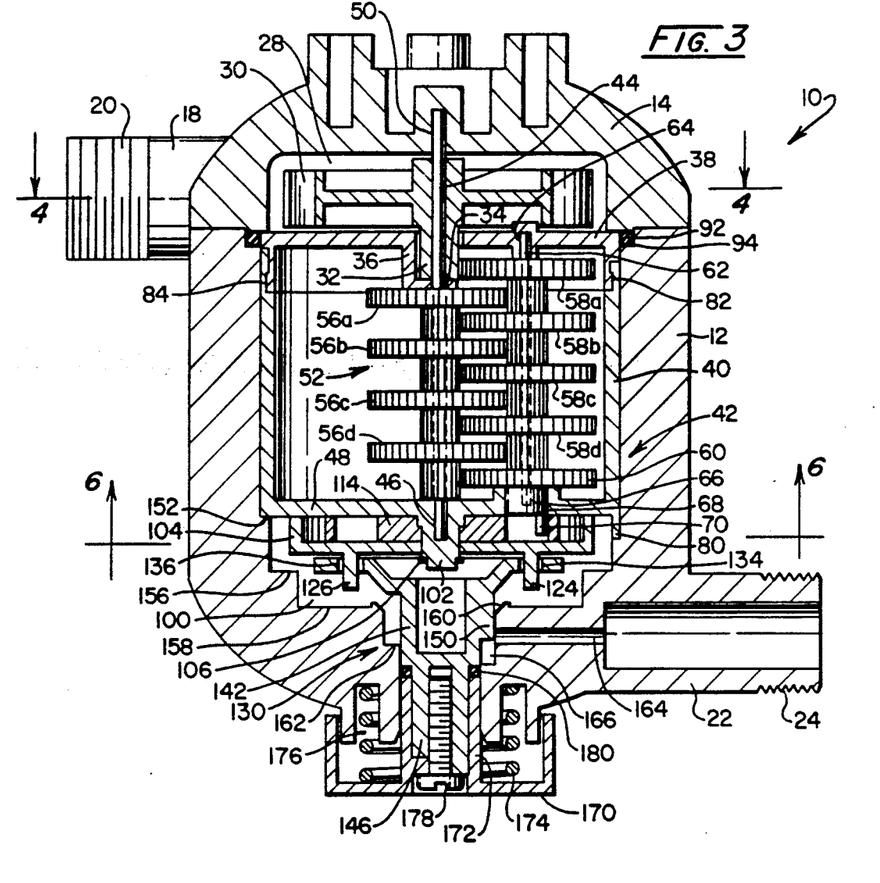
FIG. 3 is a partial sectional view of the apparatus of FIG. 1.

FIG. 3 reveals that the geared lower shaft or stem portion 32 of turbine 30 extends through an opening 34 of a downwardly depending shaft bearing structure 36 formed in the cover 38 of a gear housing component 40 of a gear housing assembly represented generally at 42. Downwardly depending shaft bearing structure 36 functions to receive and support an elongate steel drive shaft 44 which is supported at its opposite end by a shaft receiving opening 46 within the bottom surface 48 of housing component 40. Drive shaft 44 additionally is seen to extend upwardly above the turbine 30 to fit within a cylindrical opening 50 formed within cap 14. Thus mounted, the turbine 30 is securely positioned for a driving association with a reduction gear train represented generally at 52 and forming part of the gear housing assembly 42. Reduction gear train 52 is seen to include a first gear array of freely rotating gears 56a-56d. This first gear array of the gear train 52 is operationally associated with a second gear array including gears 58a-58d and an output reduction gear 60. Gears 58a-58d are mounted upon a steel drive shaft 62 which is supported by gear housing component cover 38 at a receiving cavity 64 formed therein. The opposite end of shaft 62 extends into a centrally disposed opening within output reduction gear 60. Gear 60, in turn, is seen to have integrally formed therewith a rotational component configured as a cylindrical shaft 66 which extends through an aperture or opening 68 extending through a boss or the like formed within bottom 48. Extending through this gear train output opening 68 within bottom 48 is an eccentric output pin 70.

Drive is imparted from the geared stem 32 of turbine 30 to the initial gear 58a of the gear train 52 by virtue of its emmeshment therewith through an opening formed in the semi-cylindrical bearing 36 of the top cover 38 of gear housing component 40.

Figure 2:
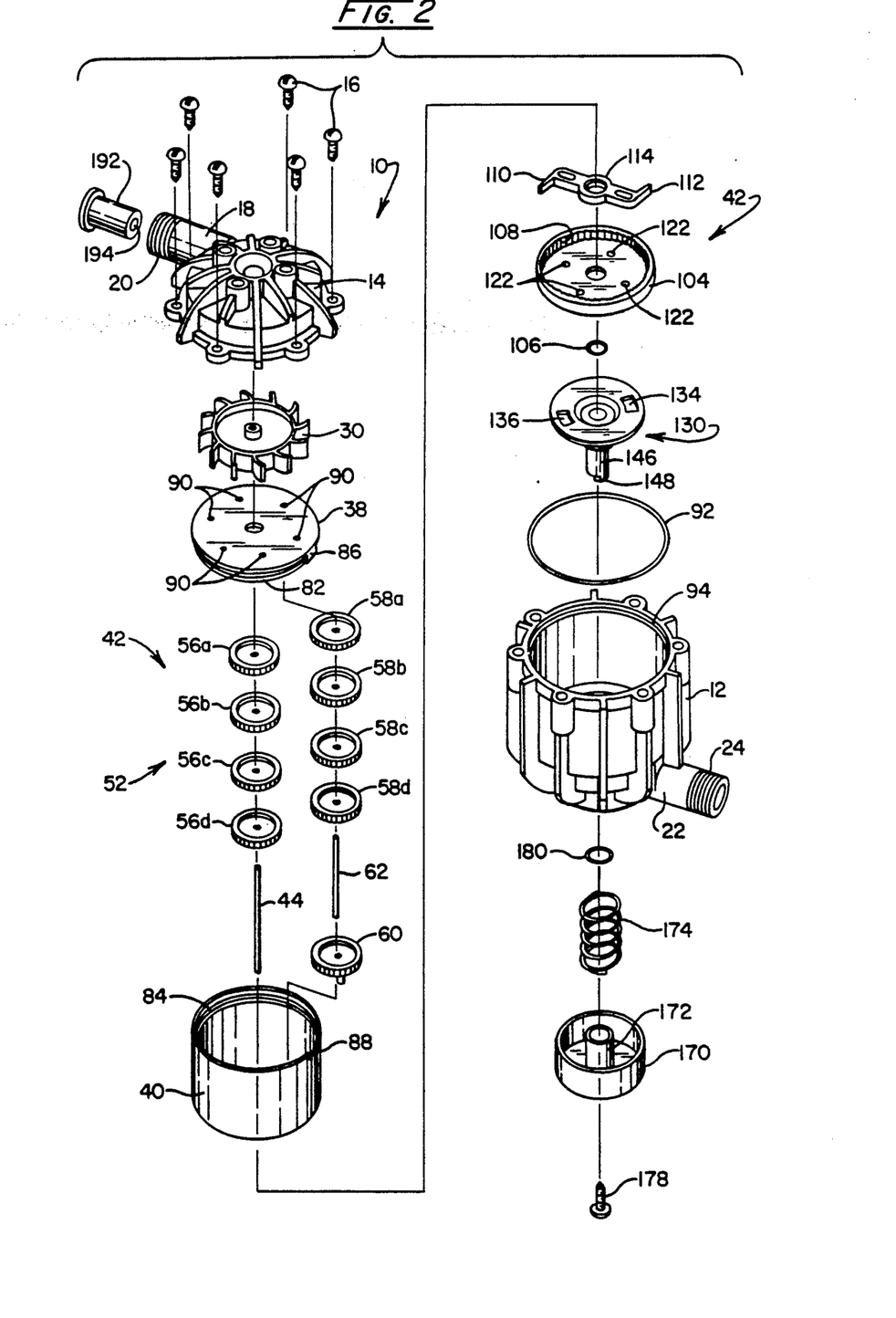
FIG. 2 is an exploded perspective diagram of the apparatus of FIG. 1.
Figure 7:
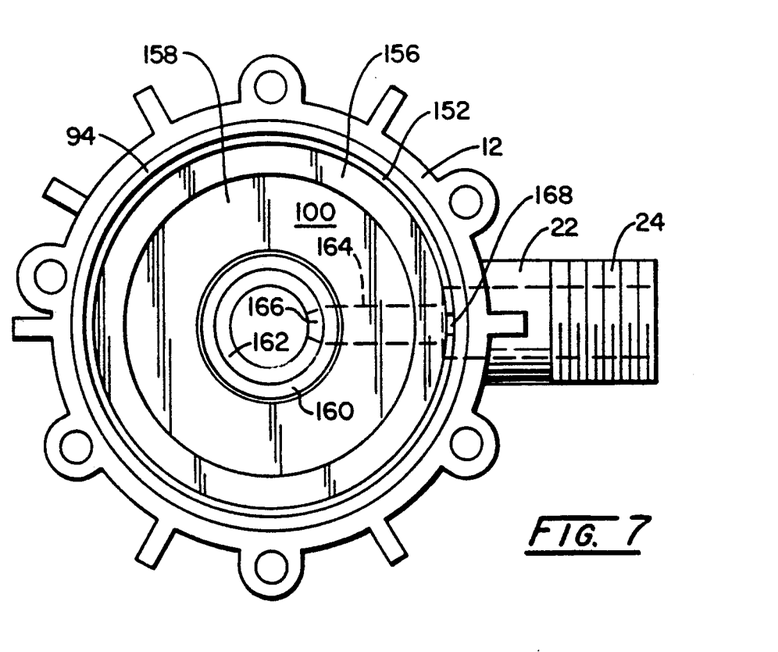
FIG. 7 is a partial top view of the apparatus of FIG. 1 with portions removed to reveal internal structure.
Figure 8:
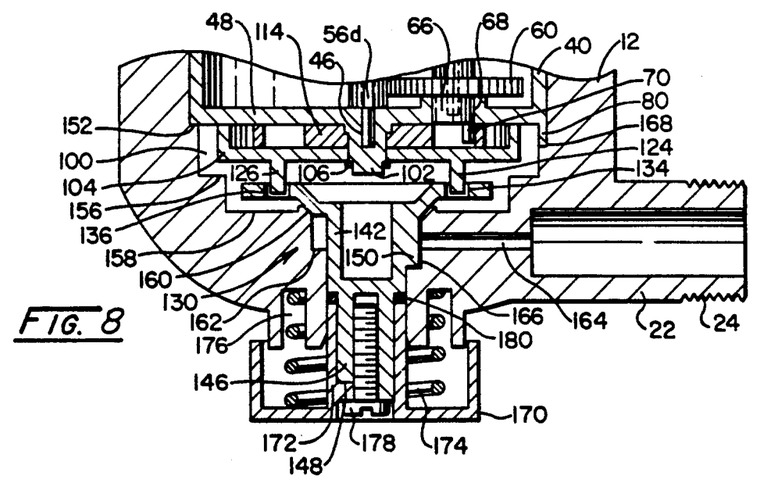
FIG. 8 is a partial sectional view similar to that shown in FIG. 3 but representing the valve components thereof in a closed orientation.

The gear housing component 40 is seen to be positioned within a corresponding gear cavity of housing body portion 12 and is inserted within that cavity in appropriate alignment by virtue of an integrally formed aligning tab 80 cooperating with a slot 168 shown in FIGS. 7 and 8. This housing component 40 forms one aspect of the device 10 which facilites its manufacture. The housing cover or top component 38 is snapped readily into its cover position by virtue of a ridge 82 formed therein which resiliently engages a corresponding groove 84 within the housing component 40. To assure the proper alignment of the cover 38, a tab 86, as seen in FIGS. 2 and 6 formed therein engages a slot 88 within housing component 40.

The components of gear housing assembly 42 thus far described are readily manufacturable with the holding of tolerances for the reduction gear train 52 and the turbine 30, inter alia, by virtue of the rigid retention of drive shaft 50. Tolerances are achieved, therefore, with a readily assembled sub-assembly which will be seen to include certain additional components in keeping with this improved assembly approach.

With the arrangement shown, the initial drive to reduction gear train 52 is from the gear shaft portion 32 of turbine 30 which engages the corresponding teeth of reduction gear stage 58a. Stage 58a, in turn, engages gear stage 56a and the sequence of reductions continues to the final output stage 60. During the course of this reduction performance, fluid is caused to flow from the input conduit 18 and input port 26 through the turbine chamber 28 and then through openings or apertures 90 formed within gear housing component cover 38 as seen in FIGS. 2 and 4. Fluid tight integrity for the cap 14 and housing 12 combination, as well as the gear housing component 40 and its cover 38 is provided by an O-ring 92 (FIG. 3) mounted at a shoulder 94 formed within housing 12. Positioned immediately beneath gear housing 38 is a valve chamber 100 as seen in FIGS. 3 and 8. A portion of the gear housing assembly 42 will be seen to extend into this chamber 100. In this regard, looking to FIGS. 2, 3, and 6 it may be seen that the bottom 48 of housing 40 is configured to form a hub or axle 102 which, not only serves to provide material for the formation of shaft receiving opening 46, but also serves as the central hub for the rotational support of a cup-shaped rotational drive component 104. Retained on hub 102 by a clamp ring 106, the rotational drive component 102 is generally formed as an open cylinder, the interior peripheral wall of which is configured having ratchet teeth 108, the lengthwise extents of which are aligned with the axis of device 104. Cooperating with these ratchet teeth 108 are the flexible arm portions 110 and 112 (FIG. 6) of a dual armed pawl 114. Pawl 114 is mounted for free rotation about hub 102 and is retained in place by the rotational drive component 104. A slot 116 within one arm of pawl 114 receives the downwardly extending eccentric output pins 70 of output reduction gear 60. That pin 70 acts as a lever actuator and is, thus, an eccentric component which functions to drive the pawl 114 in a reciprocating manner rotationally about hub 102.

Figures 4, 5, 6:
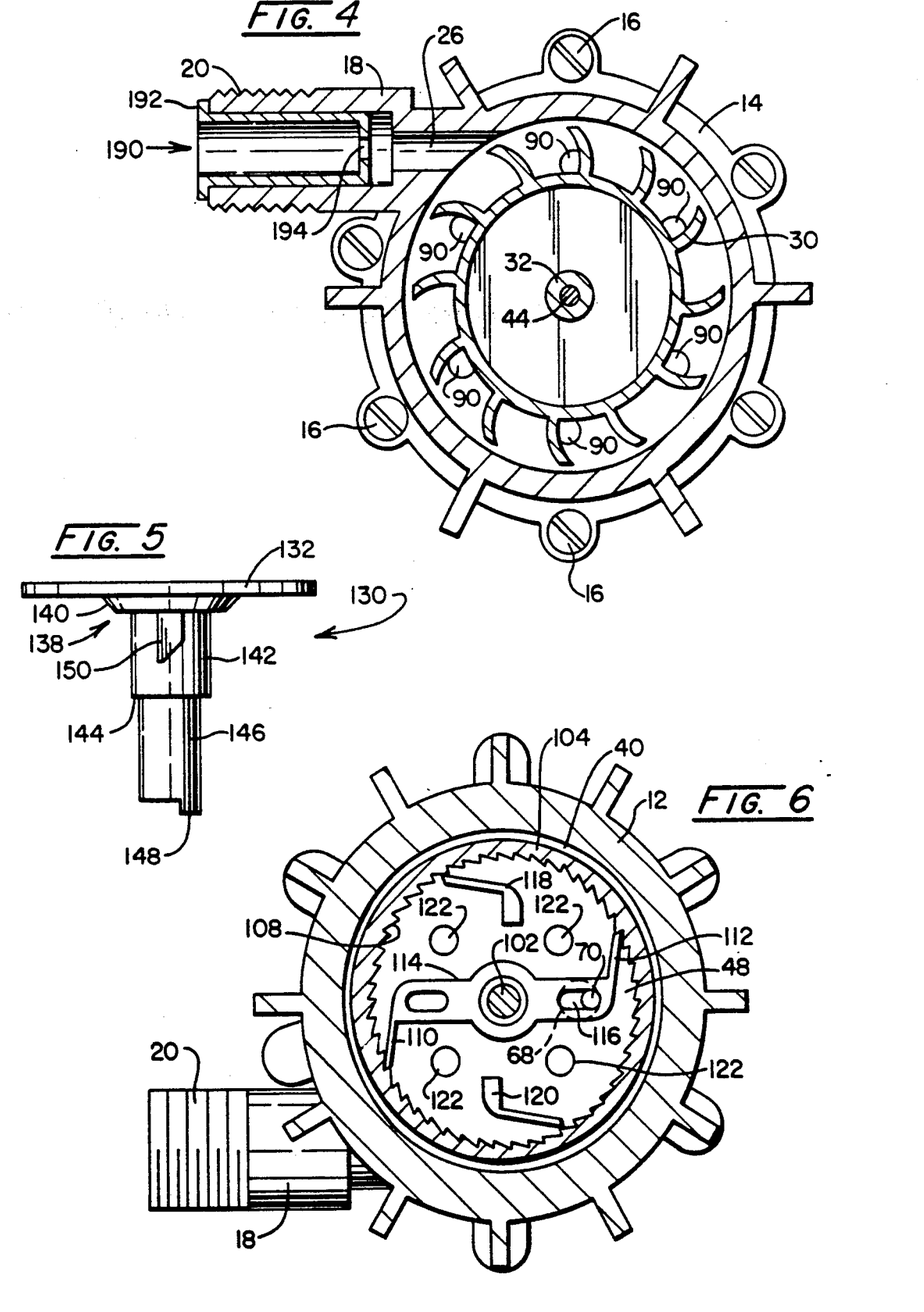
FIG. 4 is a sectional view of the apparatus of FIG. 3 taken through the plane 4—4 thereof.
FIG. 5 is a side view of a rotatable valve employed with the apparatus of FIG. 1.
FIG. 6 is a sectional view of the apparatus of FIG. 3 taken through the plane 6—6 thereof.

FIG. 6 further reveals that flexible stop pawls 118 and 120 are integrally formed within the bottom side 48 of gear housing 40 and function to restrict the movement of the ratchet driven rotational drive component 104 to a singular rotational direction. Further, four apertures identified at 122 are formed within the bottom side 48 of gear housing component 40 for purposes of permitting fluid flow from the interior of housing 40 into the valve chamber 100. With an appropriate selection of the number of ratchet teeth within rotational drive component 104, as well as the selection of reduction gear structuring for reduction gear train 52, a ratio of rotation between the turbine 30 and the rotation of rotational component 104 may be greater than, for example, 3,900,000:1. In general, 40 ratchet teeth 108 are provided.

Returning to FIG. 3, it may be observed that rotational drive component 104 additionally is formed having a valve drive portion or arrangement which is comprised of two spaced, downwardly depending studs 124 and 126. This essentially completes the sub-assembly or gear housing assembly 42. The entire sub-assembly 42 is completed during manufacture, whereupon turbine 30 is attached and it may be placed as a unit, with all tolerances met, within the housing 12. As this is carried out, a previously inserted rotatable valve member represented generally at 130 will be engaged by studs 124 and 121 under conditions requiring only broad tolerances. Looking to FIGS. 2, 3, and 5, the rotatable valve member 130 includes an upwardly disposed driven portion or disk 132 which is seen in FIG. 2 to include two spaced openings 134 and 136 adopted to slideably receive respective studs 124 and 126, and by abutment therewith, rotational movement is imparted to member 130. It further should be observed that the member 130 may slide vertically upward or downward while maintaining the abuttable and slideable contact between openings 134 and 136 thereof with respective studs 124 and 126, for example as represented by observing FIG. 3 in comparison with FIG. 8.

Returing to FIG. 5, the rotatable valve member 130 is seen to include a valve closure portion shown generally at 138 having a beveled component 140 extending from disk 132, as well as a cylindrical valve shaft 142 extending to a valve shoulder 144 and from which there extends a valve support stem 146. Stem 146 also is halved at its bottom portion to form a half cylindrical connection 148 which is utilized as a coupling structure for the manual rotation of the member 130. Of particular note, however, is a camming stem 150 formed integrally with the valve shaft 142. This camming stem 150 functions to retain the rotatable valve member 130 in an open orientation during its slow, incremental rotation carried out under the drive of rotational drive component 140 performing in response to the eccentric output of the reduction gear train 52.

Referring additionally to FIG. 7, a view looking into housing 12 without the presence of other components, including the rotatable valve member 130 is presented. In the figure, the shoulder 152 upon which the gear housing component 40 bottom surface 48 rests is revealed, and, adjacent to that shoulder, is the valve chamber 100. The chamber 100 is stepped initially at a ridge 156 and then descends to the lower surface thereof at 158. The lower surface 158 of the valve chamber 100 leads to a beveled valve seat represented at 160. Below the beveled valve seat 160 there is formed a circular valve cam surface 162. It is upon this surface 162 that the camming stem 150 of valve member 130 slides during that period of performance of the monitoring device 10 when the valve components of it are open. This open valve relationship is revealed in the orientation of components shown in FIG. 3. In this regard, during an open orientation, the rotatable valve member 130 is elevated by virtue of the camming action of the camming stem 150 against the valve cam surface 162 and the output port 164 seen leading to conduit 22 is open to permit the fluid passage.

Returning to FIG. 7, when the camming stem 150 as seen in FIG. 5 has rotated under the drive of rotational drive component 140 to the position of a detent or closing slot 166 extending downwardly from the valve cam surface 162, the rotatable valve member 130 will drop under spring bias as the camming stem 150 inserts within slot 166. As this occurs, the openings 134, 136 (FIG. 2) within the disk component thereof 132 will slide but remain in engaging abutment with downwardly depending studs 124 and 126 as revealed in FIG. 8. Finally, slot 168, intended for the receipt of tab 80 is shown.

Referring to FIG. 8, the orientation of the components thus far described are in condition wherein the camming stem 150 has dropped into slot 166 and the valve is closed is represented. Note that the output port 164 now is substantially closed by the rotatable valve member 130. In this orientation, the valve member 130 cannot rotate and a cuing feature ensues requiring householder intervention to reset the monitoring device 10. This reminds the householder to replace an associated filtering medium.

The resetting components of the monitoring device 10 are located at the bottom of housing 12 and include a hand manipulable cylindrically shaped knob 170 having a hollow central stem 172 which extends over the stem portion 146 of rotatable valve member 130. The internal head portion of the knob stem 172 is configured in semi-cylindrical fashion to abuttably interact with the detent 148 (FIG. 5) of the rotatable valve component 130. Thus rotation of the knob 170 will, in turn, cause rotation of the rotatable valve member 130. A helical spring 174 is shown interposed between the knob 170 and a cylindrically shaped slot 176 formed within the bottom of housing 12. Knob 170 is retained against the stem 146 by a screw 178 and the arrangement additionally functions to position a flexible O-ring 180 to provide a fluid tight seal for the assembly. Spring 174 functions to bias the rotatable valve member 130 downwardly both in the closed position shown in FIG. 8 and to provide a bias of a camming stem 150 against the corresponding valve cam surface 162 of housing 12 when the open orientation represented in FIG. 3 is at hand. This bias also facilitates the valve closing action as camming stem 150 falls into slot 166.

To reset the device 10, the user depresses the knob 170 to compress spring 174. As a consequence, the camming stem 150 is elevated. The user then rotates knob 170 and the camming stem 150 then is elevated over camming surface 162. Release of the knob 170 permits the open orientation of the valve member 130 and rotation thereof by rotational drive component 104. As is apparent, the extent of rotation of knob 170, in turn, adjusts the quantity of fluid monitored. Appropriate indicia (not shown) may be provided for this use. The extent of movement of the valve member 130 in the course of either closing or during the resetting and opening thereof is quite small being, for example, about 0.070 inch.

The size of filters with which the instant monitoring device 10 will perform may vary from installation to installation. For example, some filters may call for flow of about 2 gallons per minute, while others are designed for a flow of one-half to three-fourths gallons per minute. For lower value mass flows, an orifice may be resorted to. Looking to FIG. 4, an orifice insert represented generally at 190 is seen inserted within the input conduit 18. Insert 190 is seen having an outer flange 192 which engages the outer surface of conduit 18 and extends to an opening representing an orifice of smaller diameter shown at 194. With the arrangement, flow into device 10 may be regulated to a lesser desired value.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Apparatus for monitoring a flow of fluid through a conduit, comprising:
  a housing having an input port and an output port, connectable with said conduit;
  a turbine chamber within said housing in fluid communication with said input port for receiving fluid under pressure;
  a gear chamber within said housing adjacent said turbine chamber;
  a gear housing assembly positioned within said gear chamber and including:
  a gear housing body having a top including a shaft bearing and a bottom having a gear train output opening and a shaft receiving opening,
  a drive shaft extending through and supported by said shaft bearing and positioned within said shaft receiving opening,
  a reduction gear train having a first gear array mounted for rotation upon said drive shaft and a second gear array operatively emmeshed with said first gear array to derive a predetermined reduction ratio, said gear train having an eccentric output component at said gear train output opening, and
  a rotational drive component mounted for rotation upon said gear housing body bottom, movable in select correspondence with said eccentric output component and having a valve drive portion;
  a turbine mounted upon said drive shaft within said turbine chamber, rotatable by fluid incident thereon from said input port and coupled in driving relationship with said reduction gear train;
  a valve seat within said housing adjacent said output port and including an open valve cam surface, and a valve closing detent portion;
  a rotatable valve member mounted within said housing, having an upwardly disposed driven portion slideably engageable with said rotational drive component valve drive portion, further having a valve closure portion extending therefrom including a camming stem slideably movable upon said valve cam surface to retain said valve closure portion in an open valve orientation and movable into said valve seat detent portion to effect blockage of fluid flow through said output port; and
  reset means for repositioning said rotatable valve camming stem upon said cam surface to effect opening said valve for permitting the flow therethrough of a predetermined quantity of fluid.

2. The apparatus of claim 1 in which:
  said valve drive portion of said rotational drive component comprises two, spaced, downwardly depending studs; and
  said rotatable valve member driven portion comprises a disk having spaced openings for slideably and abuttably receiving said rotational drive component downwardly depending studs.

3. The apparatus of claim 1 in which said reset means comprises:
  a rotatable dial coupled with said rotatable valve and located outwardly of said housing; and
  spring means for biasing said dial away from said housing and for biasing said camming stem against said valve cam surface, said dial being manually depressable to remove said camming stem from said detent portion and rotatable to set said predetermined quantity of fluid.

4. The apparatus of claim 1 including an orifice insert insertable within said housing input port for restricting the mass flow of said fluid therethrough.

5. The apparatus of claim 1 in which said rotational drive component comprises:
  a cylindrical body member with an internal peripheral surface having a rachet configuration;
  a drive pawl pivotally mounted adjacent said gear housing body bottom, engageable for reciprocal pivotal movement by said eccentric output to engage said peripheral surface rachet configuration and effect the incremental rotation thereof.

6. The apparatus of claim 5 in which said rotational drive component includes a stop pawl for restricting the rotation of said rotatable valve to a single direction.

7. The apparatus of claim 1 including a valve chamber intermediate said gear chamber and said output port and in fluid communication therebetween for rotatably retaining said rotatable valve member.

8. The apparatus of claim 1 in which:
  said camming stem is formed integrally with said valve closure portion of said rotatable valve member; and
  said valve closing detent portion is a slot formed within said valve seat and dimensioned to receive said camming stem.

9. The apparatus of claim 1 including:
  a valve chamber intermediate said gear chamber and said output port and in fluid communication therebetween for rotatably retaining said rotational drive component;
  said camming stem is formed integrally with said valve closure portion of said rotatable valve member;
  said valve closing detent portion is a slot formed within said valve seat and dimensioned to receive said camming stem; and
  said reset means includes a rotatable dial coupled with said rotatable valve member and located outwardly of said housing, and spring means for biasing said dial away from said housing and for biasing said camming stem against said valve cam surface, said dial being manually depressable to remove said camming stem from said detent portion and rotatable to set said predetermined quantity of fluid.

10. The apparatus of claim 1 in which:
  said valve drive portion of said rotational drive component comprises two, spaced, downwardly depending studs;
  said rotatable valve member driven portion comprises a disk having spaced openings for slideably and abuttably receiving said rotational drive component downwardly depending studs; and
  said reset means includes:
  a rotatable dial coupled with said rotatable valve and located outwardly of said housing; and spring means for biasing said dial away from said housing and for biasing said camming stem against said valve cam surface, said dial being manually depressable to remove said camming stem from said detent portion and rotatable to set said predetermined quantity of fluid.

11. The apparatus of claim 1 in which said rotational drive component comprises:
a cylindrical body member with an internal peripheral surface having a rachet configuration;
a drive pawl pivotally mounted adjacent said gear housing body bottom, engageable for reciprocal pivotal movement by said eccentric output to engage said peripheral surface rachet configuration and effect the incremental rotation thereof; and
a stop pawl for restricting the rotation of said rotatable valve to a single direction.

12. The apparatus of claim 1 including:
a valve chamber intermediate said gear chamber and said output port and in fluid communication therebetween for rotatably retaining said rotatable valve member;
said camming stem is formed integrally with said valve closure portion of said rotatable valve member; and
said valve closing detent portion is a slot formed within said valve seat and dimensioned to receive said camming stem.

13. The apparatus of claim 10 in which said rotational drive component comprises:
a cylindrical body member with an internal peripheral surface having a rachet configuration;
a drive pawl pivotally mounted adjacent said gear housing body bottom, engageable for reciprocal pivotal movement by said eccentric output to engage said peripheral surface rachet configuration and effect the incremental rotation thereof; and
a stop pawl for restricting the rotation of said rotatable valve to a single direction.

14. The apparatus of claim 11 including:
a valve chamber intermediate said gear chamber and said output port and in fluid communication therebetween for rotatably retaining said rotatable valve member;
said camming stem is formed integrally with said valve closure portion of said rotatable valve member; and
said valve closing detent portion is a slot formed within said valve seat and dimensioned to receive said camming stem.

15. Apparatus for monitoring the flow of fluid under pressure through a filter medium of given capacity, comprising:
a housing having a body member and a cap coupled thereto;
a turbine chamber formed within said housing cap;
a gear chamber within said housing body extending from said turbine chamber when said cap is coupled with said body and in fluid flow communication therewith;
a valve chamber within said housing body adjacent to and in fluid flow communication with said gear chamber and having a valve seat, a valve cam surface, and a valve closing slot;
a gear housing assembly slideably positionable within said gear chamber and including:
a gear housing body having a top including a centrally disposed inwardly extending shaft bearing and a first shaft receiving cavity spaced therefrom, a bottom having a gear train output opening aligned with said first shaft receiving cavity, a second shaft receiving cavity aligned with said shaft bearing, and fluid passage openings within said top and bottom,
a first drive shaft having one end supported within said second shaft receiving cavity and the opposite end extending through and supported by said shaft bearing,
a reduction gear train having a first gear array mounted for rotation on said first drift shaft, a second gear array including an eccentric output component mounted for rotation upon said gear train output opening, a second drive shaft mounted between said eccentric output component and said first shaft receiving cavity for supporting said second gear array in operative association with said first gear array, and
a rotational drive component mounted for rotation upon said gear housing body bottom, movable in select correspondence with the rotation of said eccentric output component and having a slideably engageable valve drive portion;
a turbine rotatably mounted upon said drive shaft within said turbine chamber, having a gear drive component extending within said shaft bearing coupled in driving relationship with said second gear array;
an input port in fluid flow communication with said turbine chamber for directing said flow of fluid under pressure thereinto to effect rotation of said turbine;
a rotatable valve member mounted for rotation about a valve axis parallel with said first drive shaft, having an upwardly disposed driven portion slideably engageable with rotational drive component valve drive portion, having a valve closure portion extending therefrom and movable along said valve axis into closing contact with said valve seat, and a camming stem slideably movable upon said valve cam surface during rotation to retain said valve closure portion at a location remote from said valve seat effecting an open valve orientation, and movable along said valve axis into said closing slot to effect positioning of said valve closure portion into valve closing contact with said valve seat;
an output port in fluid flow communication with said valve chamber for receiving said flow of fluid under pressure when said rotatable valve member is in said open valve orientation; and
reset means for repositioning said rotatable valve camming stem for movement upon said valve cam surface to provide for said rotation of said rotatable valve about said valve axis an amount predetermined with respect to said filter medium capacity.

16. The apparatus of claim 15 in which:
said valve drive portion of said rotational drive component comprises two, spaced, downwardly depending studs; and
said rotatable valve member driven portion comprises a disk having spaced openings for slideably and abuttably receiving said rotational drive component downwardly depending studs.

17. The apparatus of claim 15 in which said reset means comprises:

a hand rotatable dial coupled with said rotatable valve and located outwardly of said housing body member;

spring means for biasing said dial away from said body housing and for biasing said camming stem against said valve cam surface, said dial being manually depressable to move said rotatable valve member along said valve axis to remove said camming stem from said closing slot and rotatable said amount predetermined with respect to said filter medium capacity.

18. The apparatus of claim 15 including an orifice insert insertable within said housing input port for restricting the mass flow of said fluid therethrough.

19. The apparatus of claim 15 in which said rotational drive component comprises:
- a cylindrical body member with an internal peripheral surface having a rachet configuration;
- a drive pawl pivotally mounted adjacent said gear housing body bottom, engageable for reciprocal pivotal movement by said eccentric output component to engage said peripheral surface rachet configuration and effect the incremental rotation thereof.

20. The apparatus of claim 19 in which said rotational drive component includes a stop pawl for restricting rotation of said rotatable valve to a single direction.

21. The apparatus of claim 20 in which:
- said valve drive portion of said rotational drive component comprises two, spaced, downwardly depending studs; and
- said rotatable valve member driven portion comprises a disk having spaced openings for slideably and abuttably receiving said rotational drive component downwardly depending studs.

* * * * *